United States Patent [19]

Hester, Jr.

[11] 3,745,925

[45] July 17, 1973

[54] TEMPERATURE AND VOLTAGE CONTROLLED CIRCUIT

[76] Inventor: Sam R. Hester, Jr., 814 Tarpon Drive, Fort Walton Beach, Fla. 32542

[22] Filed: June 22, 1971

[21] Appl. No.: 155,568

[52] U.S. Cl............ 102/70.2 R, 307/132 T, 317/40
[51] Int. Cl............................ F42b 5/08, F42b 9/08
[58] Field of Search................ 102/70.2 R, 70.2 G; 236/86; 317/37, 40; 307/132 T

[56] References Cited
UNITED STATES PATENTS 3,598,055  10/1971  Gunderson................. 102/70.2 R
3,167,018  1/1965  Brunner..................... 102/70.2 R Primary Examiner—Benjamin A. Borchelt
Assistant Examiner—J. V. Doramus
Attorney—Harry A. Herbert, Jr. et al.

[57] ABSTRACT

A control circuit incorporating a Zener diode and thermal relay in series between the circuit activating control switch and the device to protect against stray voltages at extreme temperatures.

1 Claim, 1 Drawing Figure

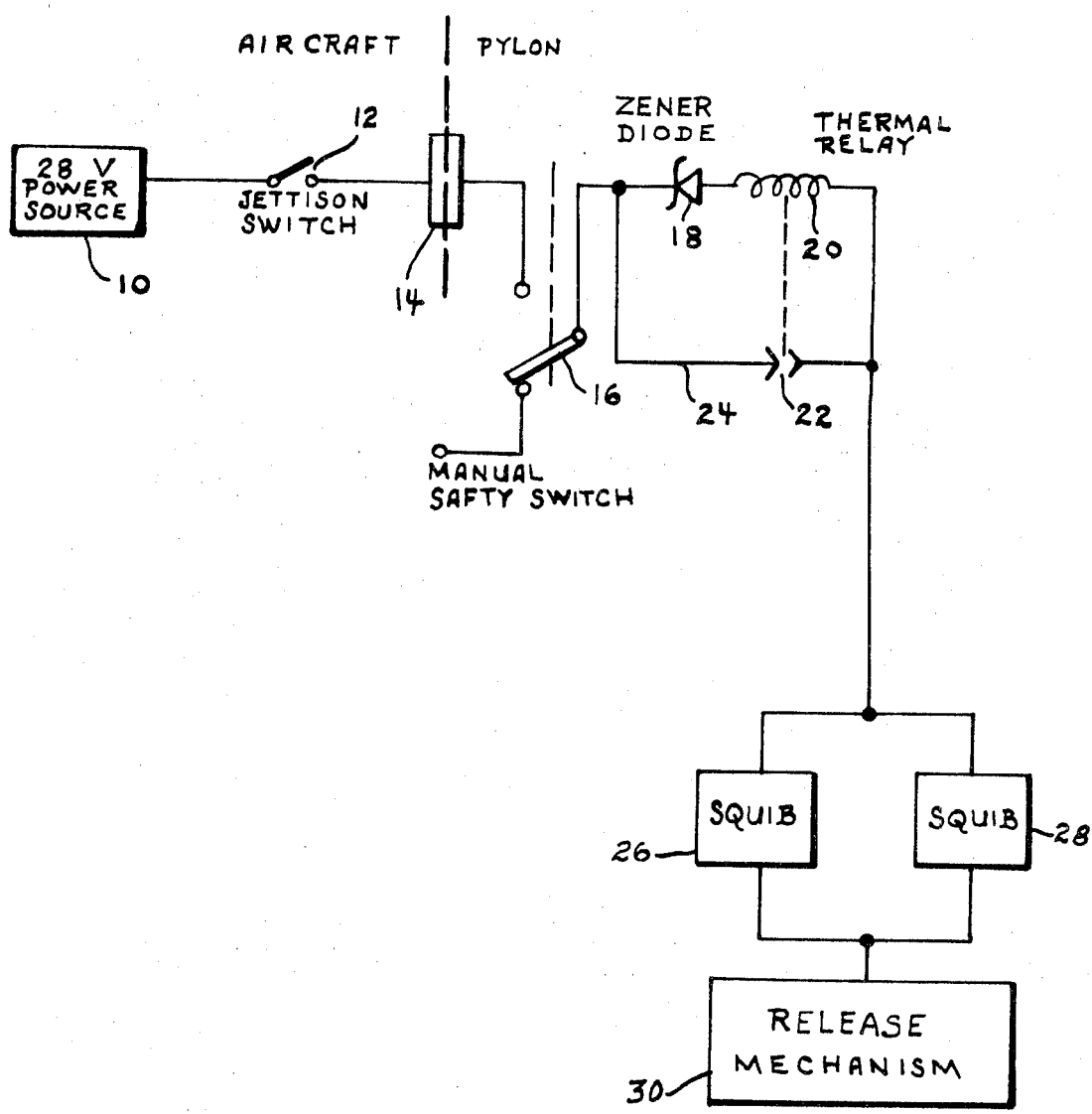

TEMPERATURE AND VOLTAGE CONTROLLED CIRCUIT

BACKGROUND OF THE INVENTION

The invention relates generally to switching circuits, and more particularly to a switching circuit that is protected against activation by stray voltages at extreme temperatures.

High performance aircraft currently in use requires jettison provisions of external pylons, fuel tanks, instrument pads and the like for combat profiles and safety requirements. Most jettison systems contain an explosive pyrotechnic, energized from a DC aircraft power source. Gas pressure developed from the exploding squib moves mechanical linkage which unlocks retaining devices and in some instances provides pressure to a cylinder to insure clean separation.

Jettison and release control switches are located in aircraft cockpit stations. Control circuits are routed from the cockpit to the various release stations on the aircraft. The release signal passes through several sequencing relays and electrical connectors between the power source and squib. These circuits are susceptible to the introduction of voltages by electromagnetic induction; high resistance leakage paths caused by wire chaffing, corrosion in connectors, etc. Wire chaffing and corrosion increase with aircraft calendar age and flying hours. Electromagnetic environment is constantly increasing due to increased airborne electronic countermeasures.

Most squibs are energy sensitive devices, having a resistance between 0.5 and 2 ohms and firing when exposed to a current between 0.5 and 1.0 amperes for approximately 5 msec. Two squibs are usually mounted in parallel for adequate reliability assurance. Assuming 0.5 ohm squibs with a firing current sensitivity of 0.5 amps each, a power level of 0.25 watts would cause squib activation if applied for 5 msec. Assuming 2 ohm squibs with a firing current sensitivity of 1 amp each, the power level is increased only four watts for squib activation.

In some instances, relays have been used in the firing circuit (mounted as close as possible to each individual squib) in order to provide some measure of protection. The use of relays for protection devices offer the following disadvantages: fast relays should be mounted in the pylon to provide maximum protection. Averaging four pylons per aircraft (with large numbers of pylons allocated for war reserve), the cost of this approach becomes significant; secondly, a typical plus 28 Volt DC mechanical relay will activate at plus 18 volt DC at room ambient temperature. At minus 55° C, the same relay will activate at approximately plus 6 volts, thus decreasing its value as a protective device. A temperature compensating relay may be used to overcome this condition with a resulting increase in cost and decrease in reliability.

A protection device is needed that will offer maximum energy protection with minimum cost and maximum reliability under all operating conditions.

SUMMARY OF THE INVENTION

The invention effectively blocks extraneous voltages from entering the circuit and causing the squib to fire accidentally.

With elimination of the mechanical relay in the circuit and the substitution of a series connected Zener diode and thermal relay the circuit becomes safe from stray voltages regardless of temperature. The currently utilized circuit consists of a 28 volt DC power source connected to a jettison switch which is hence connected through a connector to a manual safety switch located in the aircraft pylon. In the pylon is a mechanical relay and two explosive parallel connected squibs.

It is therefore an object of the invention to provide a new and improved electrical control circuit.

It is another object of the invention to provide a new and improved electrical control circuit that is protected from stray and extraneous voltages.

It is a further object of the invention to provide a new and improved electrical control circuit that is insensitive to drastic temperature differentials.

It is still another object of the invention to provide a new and improved electrical control circuit that is more reliable than any hitherto known.

It is still a further object of the invention to provide a new and improved electrical control circuit that provides a high factor of safety for the controlled devices.

It is another object of the invention to provide a control circuit which is economical to produce and utilize conventional, currently available components that lend themselves to standard mass production manufacturing techniques.

These and other advantages, features and objects of the invention will become more apparent from the following description taken in connection with the illustrative embodiment in the accompanying drawing.

DESCRIPTION OF THE DRAWING

The FIGURE is a circuit diagram of the invention.

DETAILED DESCRIPTION OF THE PREFERRED EMBODIMENT

Referring now to the FIGURE a power source is shown at 10 which may be a 28 volt D source as is conventionally used in high performance aircraft. A jettison switch 12 is located in an appropriate location within the aircraft cabin. At the interface of the aircraft with the pylon is a connector 14 adapted to decouple upon the activation of the jettison circuit, as the pylon falls away. The manual safety switch 16 is located in the pylon and is activated or deactivated by ground crew members concurrently with the preflight and postflight checks.

The Zener diode 18 is connected in series with the thermal relay 20 having contact points 22. The current passing along line 24 detonates the parallel connected squibs 26 and 28 thereby activating the release mechanism 30 and causing the separation of the pylon from the aircraft.

Below 14 volts, the Zener diode is an open circuit, above 14 volts Zener conduction occurs and if the source is capable of delivering in excess of 1.1 amperes, the thermal relay energizes closing its contact which straps the source voltage directly to the squib. This process will require approximately 2 msec for jettison voltage (plus 28 volt) to be placed at the squib contacts which is comparable with fast action conventional relay pull-in time.

The thermal relay is a one-shot device; that is, it cannot be reset. As the device is mounted in external pylons, they (along with the pylons) are expendable after jettison. The firing signal must be capable of producing approximately 18 watts for 2 msec to set up firing circuit at room ambient temperature and approximately 12 watts for 2 msec at minus 55° C. (based on a 0.07 volt/degree C. temperature coefficient for IN3313 Zener diode.

Having thus described an improved control circuit, I make the following claims as my invention.

1. An electrical control circuit for explosive devices subject to extreme temperature differentials including: a power supply; an explosive device; a first manually operated activation switch connected between the power supply and explosive device; a second manually operated safety switch connected between said first switch and said explosive device; the improvement comprising, a Zener diode the anode end of which is connected in series with the coil of a thermally sensitive relay and the cathode end of which is connected to said second switch; and a current carrying means connected from said second switch through the contacts of said relay to said explosive device.

* * * * *